W. W. ATKINSON.
ARTIFICIAL TOOTH.
APPLICATION FILED OCT. 31, 1917.
1,278,415.
Patented Sept. 10, 1918.
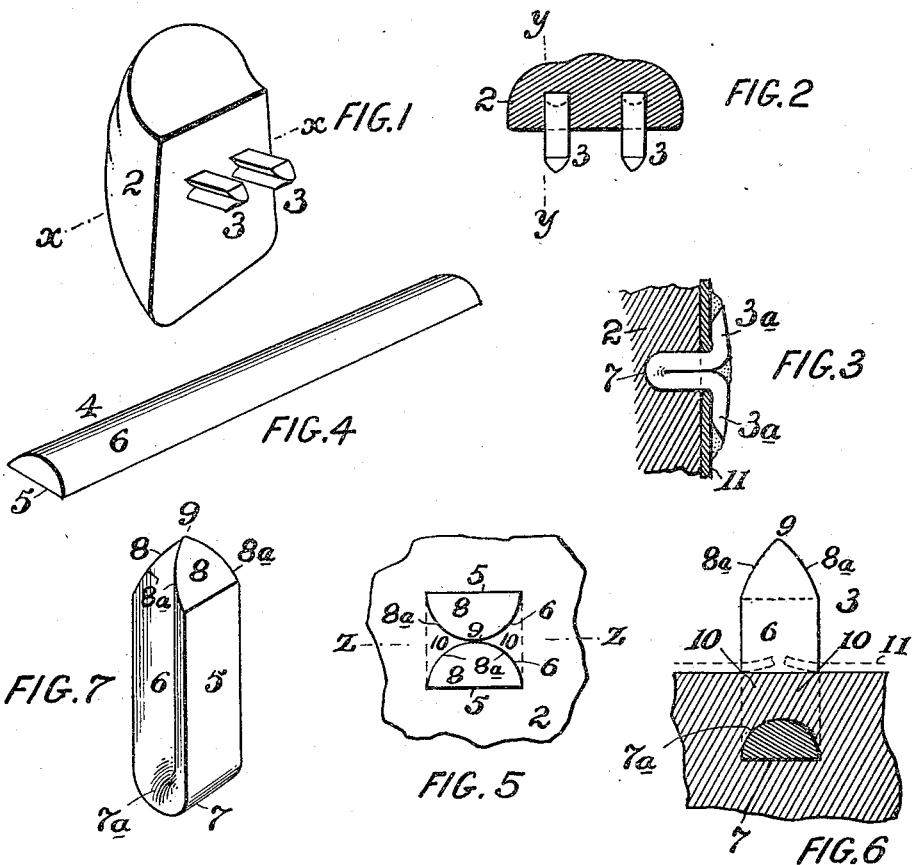

UNITED STATES PATENT OFFICE.

WILLIAM W. ATKINSON, OF CLEMENTON, NEW JERSEY, ASSIGNOR TO THE DENTISTS' SUPPLY COMPANY, A CORPORATION OF NEW YORK.

ARTIFICIAL TOOTH.

1,278,415.

Specification of Letters Patent. Patented Sept. 10, 1918.

Application filed October 31, 1917. Serial No. 199,466.

*To all whom it may concern:*

Be it known that I, WILLIAM W. ATKINSON, a citizen of the United States, and resident of Clementon, county of Camden, and State of New Jersey, have invented an Improvement in Artificial Teeth, of which the following is a specification.

The object of my invention is to provide a construction of artificial pin tooth which shall be suitable for attachment to the sheet metal of crown, bridge and other work and secure the greatest possible advantages as to security of attachment with a minimum cost both in construction and labor in application.

Broadly considered, my object is to provide a tooth with two projecting metal prongs arranged close together at the back of the tooth and said prongs arranged back to back and of a cross section which insures outer and oppositely disposed flat surfaces and inner and adjacent surfaces shaped to provide side recesses along the length of the projecting prongs considered as a pin structure.

More particularly, my object is to provide a porcelain tooth with one or more pins split their entire length extending from the back, which pins are preferably pointed to perforate the plate and capable of having their split portions spread apart upon the back of the plate and soldered in position, whereby the porcelain tooth is securely fastened as a facing to the metal crown or bridge plate.

My object is further to provide a special construction of split pin formed of a wire having a cross section of semi-cylindrical shape and bent upon itself to form two prongs with their rounded surfaces in contact, said pin preferably secured in the fused porcelain of the tooth and anchored thereporcelain of the tooth and anchored thereporcelain extending over the metal in by the porcelain extending over the metal of the pin at the bend thereof and filling of the pin at the bend thereof and filling the grooves or spaces on each side between the contacting surfaces and the side edges of the metal portions comprising the split pins.

My object is also to point the split pin last above specified, by beveling the outer ends of the projecting metal, the planes of the bevel extending from the opposite flat sides of the two projecting portions of the pin and terminating in the adjacent curved portions thereof, whereby there shall be provided approximately a single point and four inclined cutting knife edges radiating from the point and terminating in the side edges of the flat surfaces aforesaid; and moreover, providing flat outer sides for more easy and sharp bending of the two legs of the pin after it has been forced through the metal plate or crown in applying the facing.

My invention also consists of improvements hereinafter described whereby the above objects and results are attained, said improvements comprising certain organization and combination of parts which are fully described hereinafter and more particularly defined in the claims.

Referring to the drawings:—Figure 1 is a perspective view of a porcelain tooth embodying my invention; Fig. 2 is a cross section of the same on line $x$—$x$; Fig. 3 is a vertical section corresponding to line $y$—$y$ of Fig. 2 but showing the split pin extending through the sheet metal and the prongs bent over; Fig. 4 is a perspective view of a strip of the metal from which the split pins are made; Fig. 5 is a face view looking on the end of a pin and its supporting porcelain; Fig. 6 is a transverse sectional view taken on line $z$—$z$ of Fig. 5; and Fig. 7 is a perspective view of the split pin before being secured in the bisque tooth.

2 is the porcelain tooth, and 3, 3, are the split pins of metal secured therein and projecting rearwardly. These pins are preferably made from a length of wire 4 of semi-circular cross section, being flat on one face as at 5 and semi-cylindrical on the other face as at 6 (Fig. 4). When this wire 4 is bent upon itself, the bend taking place on the semi-cylindrical face 6, we have a construction as shown in Figs. 5 and 7, in which the curved face portions 6, 6, come into contact or close alinement and the flat surfaces 5, 5, arranged outward. When the split pin is thus formed, it will be observed that there will be longitudinal grooves or recesses on opposite sides of the pin and between the planes of the flat faces 5, 5, (Fig. 5); furthermore, the bend at 7 provides the lateral shoulders $7^a$ at each side. When a split pin of this character is placed in the mold and the bisque material built up around its bent end, the said bisque material will be packed over the shouldered portion $7^a$ and into the channels or grooves portions at the sides of the pin, as shown in Fig. 6; and when vitrified, the procelain so formed securely holds the pin tightly in the tooth with its ends extending outward from the rear face as shown. I also prefer that the outer ends of the pin prongs shall be beveled as at 8, the beveled portions of each prong having an opposite incline so that the planes of said beveled portions meet in the abutting curved surfaces of the prongs (Fig. 7) and thus provide a pointed pin structure at 9. Furthermore, the inclined edges formed by the juncture of the curved surfaces 6 and the inclined surfaces 8 provide sharp cutting edges 8$^a$ forming an X when looking down upon the point 9 (Fig. 5).

These pins may be formed of any suitable metal, alloy, or association of metals that will withstand the fusing temperature of the bisque when vitrifying the molded tooth. While I prefer to mold my improved split pin into the bisque before vitrification, it will be understood that the pin may be secured in position by being soldered to an anchor provided in the bottom of a hole formed in the vitrified tooth in the usual manner of making soldered pin teeth, and hence I do not confine myself to the specific manner of securing the pin to the tooth herein illustrated.

It will now be understood that a tooth of the above described construction, provided with one or more of such split pins, may be secured to the sheet metal of crown or bridge work and constitute a facing therefor; and in accomplishing this result, the point of the pin is thrust through the sheet metal 11 and the free ends of the pin bent over sharply against the back thereof, as shown in Fig. 3, in which position the pin ends may be soldered to insure a rigid connection. It will be understood that when the pin is forced through the sheet metal of the crown or bridge work, the perforation will be more or less of an X incision (Fig. 5), and when the pin ends are bent down their flattened surfaces 5 crowd down the outwardly bent edge of the sheet metal and make a tight joint. Furthermore, the incisions, corresponding to the portions 10 in Fig. 5, may have the adjacent metal forced down between the curved surfaces 6 of the pin to more tightly close the perforation. When the solder is applied it will remain on the back and unite the parts in a most effective manner. While the pointed end of the pin may insure a perforation of the sheet metal, nevertheless, where the sheet metal is very thick the perforation may be partly made with a separate perforating tool and then the pin itself forced through to make a close fit.

The special advantage of the pin of the construction above described, resides in the fact that it insures a strong hold in the porcelain, makes a perforation in the sheet metal which permits of a close fit, provides outer flattened surfaces about which the pin ends may be bent to enable them to fit down flat upon the sheet metal to provide an extended area for soldering, and in said bending, to crowd down the upturned edges of the metal bounding the perforation.

The essential feature of my invention resides in a porcelain tooth provided with two projecting metal prongs which extend outwardly from the attaching surface, said prongs secured in the porcelain in any manner desired and arranged close together, the outer and oppositely disposed surfaces of the prongs being substantially flat and the adjacent surfaces shaped to jointly provide longitudinal side grooves respectively at opposite sides of the pin or prong structure, and the prongs preferably beveled to provide a substantially pointed or self perforating end.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to secure by Letters Patent, is:—

1. A porcelain tooth having a split pin secured therein and projecting from the rear, said pin formed of a length of metal wire of substantially semi-cylindrical cross section bent upon itself so that the curved surfaces are brought together and the outer surfaces present flat portions about which the respective prongs may be bent when securing the tooth to sheet metal crown or bridge-work.

2. A porcelain tooth having a two-prong metal structure and projecting from the rear, said structure formed of metal wire of substantially semi-cylindrical cross section and the two prongs having the curved surfaces adjacent to provide side grooves and the outer surfaces flat and about which latter the respective prongs may be bent when securing the tooth to sheet metal crown or bridge-work, the ends of the prongs beveled in opposite directions to form a point and cutting edges radiating from the point.

3. An artificial tooth comprising a porcelain tooth having fused therein a split pin formed of a length of metal wire having a flat longitudinal surface, bent upon itself to provide juxtaposed prongs presenting oppositely directed flat surfaces on its sides, and the ends of the prongs beveled in opposite directions from the flat surfaces to provide a pointed construction.

4. A porcelain tooth having a pin structure secured therein and projecting from the rear, said pin structure formed of projecting metal prongs arranged back to back and providing longitudinal side grooves, as having their outer surfaces flat and about which flat surfaces the respective prongs may be bent when securing the tooth to sheet metal crown or bridge-work.

In testimony of which invention, I hereunto set my hand.

WILLIAM W. ATKINSON.

Witness:
E. W. S. GEORGE.

Copies of this patent may be obtained for five cents each, by addressing the "Commissioner of Patents, Washington, D. C."